Dec. 31, 1968  H. HESSE ET AL  3,419,031
BREATHING VALVE
Filed March 11, 1966
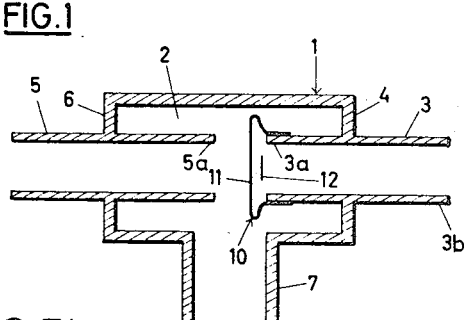
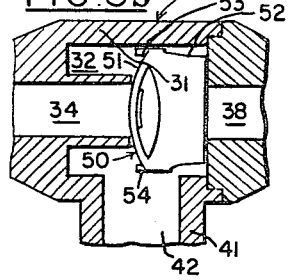
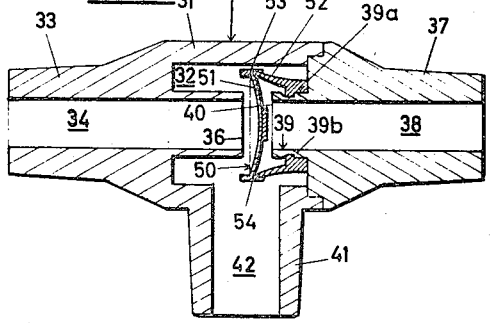
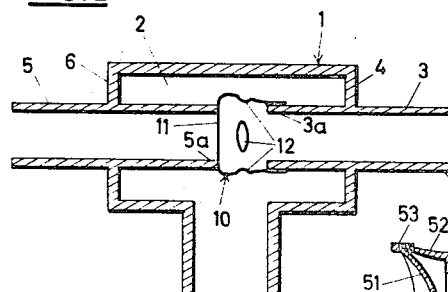
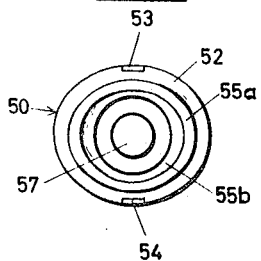
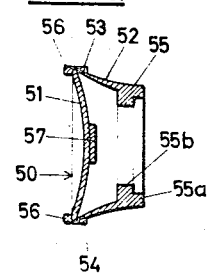
INVENTORS
Holger Hesse &
Frantz Hansen
BY Spencer & Kaye
ATTORNEYS

United States Patent Office 3,419,031
Patented Dec. 31, 1968

3,419,031
BREATHING VALVE
Holger Hesse, Skovtoftebakken 19, Virum, Copenhagen, Denmark, and Frantz Hansen, Copenhagen, Denmark, said Hansen assignor to said Hesse
Filed Mar. 11, 1966, Ser. No. 533,639
Claims priority, application Great Britain, Mar. 15, 1965, 10,911/65; Apr. 21, 1965, 16,833/65
12 Claims. (Cl. 137—102)

ABSTRACT OF THE DISCLOSURE

A breathing valve having a resilient valve element in which opposed inlet and outlet conduits terminate in mutually opposed spaced annular inlet and outlet seats. The valve element is a resiliency expansible hood in which an open end is provided. The valve element is sealingly attached around the inlet seat. Upon expansion of the hood a top portion of the valve element opposite the open end closingly contacts the outlet seat. At least one part is provided through the wall of the valve element outwardly of the top portion such that when the hood is expanded the part is closed and, when the hood is contracted, the part is opened.

---

The invention is concerned with a valve adapted to direct a forced flow of air or gas from a source such as a breathing bag (anaesthetist's bag or resuscitating bag), or the bellows or cylinder-piston units of other artificial breathing machines or devices to the lungs of a patient, said valve also being adapted to be operated for supply of air or gas from the source by suction due to spontaneous breathing of the patient. Operation of a valve of this kind generally will involve closing of an outlet to the atmosphere during the insufflation period and opening of said outlet during the expiratory phase. In addition such a valve should be adapted to pass an idle or surplus supply of gas or air directly from the valve inlet to said outlet, such gas or air bypassing the conduit leading to the patient.

While a number of such valve constructions are known and in use, such known constructions do not satisfy all practical demands. For example, it is imperative that air and gas flow resistance in the valve should be very low; air or gas losses during shift of the valve between the inspiratory and expiratory phases should be minimized; air must not be breathed back through the inlet into the air or gas supply system; the valve must be constructed in a way eliminating the risk of blocking due to freezing or sticking; a very important aspect also is simplicity of construction permitting the valve to be taken apart for cleaning and disinfection and to be reassembled with greatest ease and irrespective of the conditions under which the valve is used.

Valves of the type here principally referred to are of the three-way type and comprise within a valve body an inlet conduit communicating with a source of air or gas, an outlet conduit opening to the atmosphere and a third conduit communicating with the lungs of the patient, usually via a breathing mask; movable within the valve body cavity is a valve element having several different working positions enabling the valve to perform several or all of the following functions:

Opening the inlet conduit for the reception of air or gas surge flow upon specific operation of a pressurizing means such as a compressible bag;

Closing the outlet conduit such as to conduct said surge flow into the conduit leading to the lungs of the patient, this function obviously being correlated to the first-mentioned inlet opening function;

Opening the inlet conduit by the sucking action involved in spontaneous breathing, a check valve provided in the outlet conduit if necessary preventing (contaminated) air from being insufflated;

Opening the outlet conduit during spontaneous or forced expiration from the lungs of the patient, the inlet conduit having been closed by the valve in advance of the opening of the outlet conduit or being closed simultaneously or with the least possible delay;

Permitting steady low pressure flow of air or gas from the inlet conduit to the outlet conduit past the patient conduit, for example, when an air or gas supply bag is pressure filled at a rate greater than the amount periodically discharged into the lungs of the patient by compression of the bag.

The majority of valves nowadays used for performing the above and similar functions are of the type in which a movable rigid valve element is urged or restored to or held in one functional position by spring means, magnetic means, gravity or otherwise whereas other functional positions of the valve element are obtained through the interaction of said biasing means with the steady or surge flow pressure of the air or gas entering the valve through the inlet conduit or with reduced pressure in a conduit, e.g. due to spontaneous breathing. None of the prior art valves having some kind of rigid valve element has satisfactorily fulfilled all the above requirements.

While some types of valves have been proposed having a resilient rather than a rigid valve element such known constructions have not either been fully satisfactory in all the above-mentioned respects, e.g. due to the fact that actuation of the valve requires a shift of the valve element from a starting position to a seated position before the flow passage through the valve is opened.

It is an object of the present invention to provide a breathing valve of the three-way type as defined above having a valve element of the resilient type, such valve element being provided within the valve body cavity and adapted to be urged by its own resilience to one functional position, other functional positions being obtained by the interaction between, on the one hand, the inherent resilience of the valve element and, on the other hand, pressure and suction conditions induced within the valve body from any of the conduits, such valve element having a portion acting in one functional position of the valve element as a check valve in relation to one of the conduits and a portion acting in another functional position of the valve element as closure element in relation to another one of the conduits, said valve element also having an inner cavity in communication with one of said conduits and a port or ports opening upon initial expansion of the valve element against its inherent resilence to connect the inner cavity of the valve element to the valve body cavity, said port or ports being provided at a position or positions outwardly of the portion of the valve element acting as closure element.

When used in closest analogy to prior art rigid valve elements the resilient valve element of the invention is placed upon the inner end of the inlet conduit within the valve body cavity to act in its relaxed or contracted condition as a check valve in relation to this inlet conduit while leaving the outlet conduit in open communication with the valve body cavity whereas, under the action of a forced air or gas flow from the inlet conduit it will be expanded to varying degrees, depending on the interaction between its resilience and the pressure or suction applied, to take positions involving a lesser or greater degree of bulging and opening of the port or ports up to a final functional position taken as soon as a certain predetermined pressure of air or gas supply is reached or surpassed, the portion of the valve element acting as a closure element in this position being in closing contact with the outlet conduit while a flow path is open from the inlet conduit to the patient conduit via the inner cavity of the valve elements, the port or ports therein and the valve body cavity. At pressures below said predetermined pressure the outlet conduit is not closed and in open communication with the inlet conduit. Air pressure supplied from the patient conduit due to expiration by the patient will cause the resilient valve element to act as a check valve closing the inlet conduit almost instantaneously and practically simultaneously with the opening of the outlet conduit.

Some illustrative embodiments of valves comprising a resilient valve element embodying the present invention will be described in detail hereafter by way of example and by reference to the attached drawings in which FIGURES 1 and 2 are schematic sectional views of a breathing valve of the three-way type with the resilient valve element shown in FIG. 1 in the rest position and in FIG. 2 in the fully actuated position; FIG. 3a is a schematic sectional view of another three-way breathing valve provided with another type of resilient valve element in the rest position and in FIG. 3b in the fully activated position, said valve element being separately shown in FIGS 4a and 4b in respectively section and bottom plan view in the state of deformation as acquired upon mounting in the valve and in FIGS. 5a and 5b in respectively section and bottom plan view in the relaxed state assumed upon detachment from the valve.

The valve schematically shown in FIGS. 1 and 2 comprises a valve body 1 enclosing a valve cavity 2. An inlet duct defining tube 3 is sealingly inserted through one end wall 4 of the valve body 1 and terminates in a central zone of the valve cavity 2 with the inner end 3a in spaced opposing relation to the inner end 5a of an outlet duct defining tube 5 sealingly inserted through the opposite end wall 6 of the valve body. The end 3b of inlet tube 3 extending outwardly from the valve body is adapted to be sealingly connected to a source of air or gas supply, such as a resuscitating bag or equivalent equipment. Extending outwardly from and surrounding an aperture provided in the side wall of the valve body 1 centrally between the opposed end walls 4 and 6 is a tubular patient duct defining flange 7 adapted to form or to be connected to an implement for supplying air or gas to the respiratory ducts of a patient. As described so far the breathing valve is fully conventional.

The novel feature of the present invention resides in the novel valve element used selectively to establish various required connections between inlet duct 3, outlet duct 5 and patient duct 7 in respect to various operating conditions encountered during forced supply of breathing gas to the patient, spontaneous breathing of the patient, spontaneous or forced expiration and steady low-pressure gas flow bypassing the patient duct. As distinguished from the rigid externally biased valve elements now predominantly used in breathing valves of the general type here in question the valve element of the present invention is of a resilient self-biasing type.

As shown in FIGS. 1 and 2 the resilient valve element is shaped as a cap or hood 10 of soft rubber or similar material with the open end tightly fitting around or otherwise connected to the end of the inlet tube 3 within the valve cavity 2. The end portion 11 of this cap or hood opposite to the open end thereof is adapted upon expansion of the cap to come into closing contact with an opposed valve seat formed at the end 5a of the outlet conduit 5 within the valve body cavity 2. Between the outlet closing end portion 11 and the open end connected to the inlet conduit 3 the cap or hood 10 is provided with a number of slits 12 (three of which are shown in FIG. 2) opening during pressure inflation of the cap or hood 10 and closing by resilient contraction in the relaxed or non-inflated condition of the cap or hood. The dimensions of the hood, the spacing between the inner ends 3a and 5a of the inlet and outlet conduits 3 and 5 and the circumberence of the opposed ends of these conduits are chosen so that the same end portion 11 of the cap or hood in the fully expanded state shown in FIG. 2 closes the outlet conduit 5 (by its outer surface) and in the fully relaxed condition of the cap or hood is in position to act (by its inner surface) as an inlet closing check valve when being pressed inwardly towards the edge of the end 3a of inlet conduit 3 by pneumatic pressure created in valve body cavity 2, e.g. due to expiration of the patient.

As an obvious equivalent of the construction illustrated in FIGS. 1 and 2 the resilient valve element might be a bellows connected at its open end to the inlet conduit and facing with the opposite closed end the seat surrounding the inner end of the outlet conduit within the valve body cavity. Also in this case the port or ports of the valve element may be slits provided intermediate the outlet closing portion at the closed end of the bellows and the portion thereof merging into the inlet conduit.

Very satisfactory embodiments of the resilient valve element of the present invention are obtained by providing a port or ports of the labial type. As used here the term labial-type port is intended to designate a passage formed between opposed side surfaces of thin resilient elements extending from the mouth of a conduit in resilient abutment against each other in the direction of gas flow through said conduit. Gas pressure acting behind a valve element having a labial type of port, e.g. gas pressure emanating from the inlet conduit of a breathing valve, will open the flow path through the port without meeting appreciable resistance whereas in the absence of such a pressure or in the presence of an oppositely directed pressure, e.g. caused by expiration from the lungs of the patient, the abutting surfaces will be urged towards closed position. The labial type of valve port will yield to a wide variety of pressures ranging upwardly from the very low pressure necessary to overcome the resilient resistance of the opposed lips against separation by gas flow. Upon reversal of the pressure conditions the labial port will close instantaneously under the combined action of inherent resilience and outer pressure urging the lips into tight engagement.

A resilient valve element having labial ports is shown in connection with the embodiment of a three-way breathing valve illustrated in FIGS. 3a and 3b. Valve body 30 comprises a substantially cylindrical central portion 31 enclosing a valve body cavity 32. Axially extending from the central portion is a tubular outlet portion 33 having reduced outer diameter and an axial bore 34 forming the outlet duct of the valve and communicating with valve body cavity 32, said outlet duct 34 having a diameter less than said cavity. The inner wall defining bore 34 is extended into said valve body cavity 32 and terminates in the central portion of said cavity in an annular edge 36 forming an outlet seat around the inner end of the outlet duct 34.

Into the open end of valve body 30 opposite to the tubular outlet portion there is threadedly inserted a tubular inlet portion 37 having substantially the same outer shape as outlet portion 33 and also having an axial bore 38 forming the inlet duct of the valve. The inner wall of inlet portion 37 defining the inlet duct of the valve is extended in the form of an annular wall 39 into the valve body cavity, said annular wall 39 terminating opposite to and at a distance from the annular outlet seat 36 in an annular edge 40 forming an inlet seat around the inner end of inlet duct 38.

Extending outwardly from and surrounding an aperture provided in the side wall of the central valve body portion 31 substantially in front of the free space between the opposed inlet and outlet seats 40 and 36 is a tubular flange 41 formed integrally with the central and outlet valve body portions 31 and 33, said flange 41 defining a patient duct 42 in open communication with the valve body cavity 32 and being adapted to be connected to an implement, such as a breathing mask (not shown), for supplying air or gas to the respiratory ducts of a patient.

As described so far, also the breathing valve shown in FIGS. 3a and 3b is substantially conventional.

The resilient valve element 50 designed for use in the valve described above is shown in FIGS. 5a and 5b in its undeformed state as detached from the valve seat 39. FIG. 5a being a sectional side view and FIG. 5b being a bottom plan view of the valve element 50.

The valve element 50 is composed of two superimposed pieces or membranes of a suitable resilient material such as rubber, viz. a flat outer membrane 51 and an inner, funnel-shaped membrane 52, said rubber membranes having substantially identical circumferential shape and being circumferentially attached to each other such as by molding or glueing along restricted portions 53, 54 of the circumference by way of example shown in diametrically opposed positions with the non-attached circumferential portions forming said labial ports. At the throat end of the funnel-shaped inner membrane 52 the rubber material is thickened to form a stepped bead 55 having an outer portion 55a of a circumferential extension enabling said outer portion to be placed in a resiliently sealing fit around an innermost portion 39a of the annular wall 39 extending into the valve body cavity 32 from said inlet duct 38. The innermost portion 55b of bead 55 has an inner circumferential length less than said outer bead portion 55a enabling said innermost portion to come into resiliently holding and sealing engagement with a groove 39b provided in the outer surface of annular wall portion 39 intermediate its ends.

When gas even under very slight pressure is supplied through said inlet conduit 38 the gas will enter into the inner cavity formed within valve element 50 and flow through said cavity towards the non-adhered circumferential portions to be discharged therefrom into the surrounding valve body cavity 32. At pressure amounting to or higher than said predetermined pressure the cavity within the valve element, in spite of the continuous discharge of gas through the labial ports, will be widened to such an extent that the outer surface of the outer rubber membrane 51 will contact the outlet seat 36 forming the inner end of outlet conduit 34 within the valve body cavity 32 to close the outlet conduit 34 forcing the gas passing through the circumferential labial ports of valve element 50 to enter into the patient conduit 42 of the valve. Upon reversal of pressure conditions within the valve due, for example, to expiration of the patient the valve element 50 will obviously act as an extremely quick and effective check valve preventing expiration air from re-entering into the inlet conduit. The labial ports will close instantaneously as soon as the pressure prevailing within valve body cavity 32 balances the gas supply pressure in inlet conduit 38. As soon as the pressure acting on the flat outer surface of outer membrane 51 exceeds the gas supply pressure the valve element 50 will be bodily moved backward until the inner surface of outer membrane 51 is firmly seated against the inlet seat 40. The double valve closing action just described effectively eliminates back-flow into the inlet duct, the primary closing action which occurs at the labial ports instantaneously cutting-off flow communication when pressure balance is reached and the secondary closing action which occurs at the inlet seat 40 relieving the labial ports from excess pressures that might cause said labial ports to fail.

In certain cases it may be desirable that the resilient inlet conduit closing action of the valve element is strong enough to offer some resistance to a steady air or gas flow supplied for the purpose of filling a breathing bag or similar device connected upstreams of the inlet conduit of the valve. A labial valve of the type described above may offer too low a resistance to even a low-pressure steady flow and may thus pass the air or gas to the outlet conduit rather than damming up the flow for enabling the resuscitation bag or the like to become filled and expanded. For this purpose as well as for the related purpose of obtaining some kind of snap action in the valve element, in the preferred embodiment of the valve element 50 as shown in FIGS. 3a, 3b, 4a, 4b, 5a and 5b the outer membrane 51 in the relaxed condition is of outwardly concave configuration facing the inlet conduit 38 with its convex side. During pressure expansion of the resilient valve element a sudden transition from the outwardly concave to the outwardly convex condition of outer membrane 51 will occur causing the valve element to reach the outlet conduit closing position with some kind of snap action. Similarly, upon release of the gas pressure from the inlet conduit 38 or upon appearance of a predominant counter-pressure, e.g. from the patient conduit 42, the valve element 50 will be restored to its normal position closing the inlet conduit in the manner of a check valve by a particularly quick snap action caused by return of the outer membrane 51 from the pressure-induced outwardly convex to the normal concave condition.

FIGS. 4a, 4b, 5a and 5b illustrate the way in which such a concave configuration of the outer membrane 51 is obtained. In FIG. 4a the valve element 50 is shown in exactly the position taken when placed in operative position on the annular wall 39. In FIG. 5a the valve element is shown in its state as detached from the annular wall 39. From a comparison between FIGS. 4a and 5a it will appear that in the detached position of the valve element the outer membrane 51 is substantially plane whereas in the operative position the outer membrane 51 is strongly inwardly curved. This deformation of the outer membrane 51 when the valve element 50 is placed on annular wall 39 is due to the fact that the end opening of valve element 50 is defined by the outward edge of bead portion 55a is of oblong configuration in the relaxed or non-attached state of the valve element as clearly shown in FIG. 5b, the longer dimension of the opening extending between attachment zones 53, 54. When placed over the circular wall 39 the bead 55 will be deformed into circular shape, such deformation involving a resilient contraction of the valve element between said attachment zones 53, 54 and a corresponding resilient increase in width perpendicularly to the direction of contraction, the valve element substantially assuming the shape shown in FIG. 4b in which condition of the valve element the outer membrane 51 thereof is deformed into substantially elliptical shape with the long axis of the ellipse extending perpendicularly to the line connecting the opposed attachment zones 53, 54. The curvature of the outer membrane induced by said elliptical deformation is substantially cylindrical with the cylinder axis extending in parallel to the long axis of the ellipse.

Obviously, the desirable concave configuration of the outer membrane may be obtained in several other ways, such as by initially moulding or shaping the valve element in a corresponding way or by deforming and permanently setting the originally planar outer membrane in an inwardly concave condition. Similar results may be obtained by using an annular wall 39 and inlet seat 40 of non-circular cross-section in combination with a valve element having a substantially circular end opening. Either of the above described constructions will cause the valve element to be deformed in a way causing the mutually abutting rubber elements to be selectively tensioned. Obviously the deformation pattern and thereby the direction of biasing tension will be chosen so that the rigidity of the valve element is selectively increased in the zones adjacent to the valve port or ports whereby a desired resistance to low-pressure steady flow from the inlet conduit is obtained.

An alternative construction enabling the valve element to be given increased rigidity or resistance adjacent the port or ports comprises a resilient valve body in the form of a funnel adapted to be connected at the reduced open end to the inlet conduit and having the mouth end opening towards the outlet conduit. The outer edge of the mouth end is of undulate shape having portions spaced from the outlet conduit a distance greater than other edge portions. A rubber valve disc of a shape corresponding to that of the mouth opening is attached to the edge of the mouth opening along zones coinciding with the portions spaced farther from the outlet conduit, the non-attached edge portions of the funnel mouth opening and rubber disc thus forming labial valve ports having a desirable closing bias due to the attachment of the rubber disc to the "depressed" edge zones of the funnel mouth and the deformation of the rubber disc caused thereby.

As an optional feature the valve element 50 as shown in FIGS. 3a, 3b, 4a, 4b, 5a and 5b is provided with tabs 56 extending perpendicularly from the outer surface of the outer membrane and formed integrally therewith, such tabs facilitating the handling of the valve elements and also forming part of a reinforcing structure formed at the restricted circumferential portions 53, 54 at which the two membranes 51 and 52 are adhered to each other.

While a resilient and in particular a labial-type valve element as described will operate in a functionally satisfactory way some or other specimen of such valve elements may exhibit an unpleasant tendency towards humming during supply or air or gas to the patient, such humming being due to vibrations performed by the outer top surface of the valve cap or hood in its outlet-closing position. Such vibrations may be damped or attenuated by attaching to the top central portion of the cap or hood an inert mass lowering the natural frequency of oscillation of the rubber membrane below the humming limit. Obviously, the mass should be attached to the outer rubber membrane interiorly of the peripheral ports and also interiorly in relation to the marginal zone of the outer valve surface adapted to come into closing contact with the outlet seat. Preferably such an inert mass is simply a compact piece of rubber adhesively or even integrally connected to the central portion of the outer outlet-closing rubber membrane on the inner or outer surface thereof or, if required, even on both the inner and outer surfaces. Fully satisfactory damping action eliminating any tendency towards humming has been obtained in the valve element shown in FIGS. 3a, 3b, 4a, 4b, 5a and 5b by attaching to the central portion of the inner surface of the outer membrane 51, i.e. the surface facing the inlet conduit 38, a mass 57 of rubber in the form of a disc or protrusion.

Several equivalent embodiments of the valve and valve element constructions as above described will be readily apparent to the expert.

Obviously the number of labial ports provided between zones at which the inner and outer membranes are adhered to each other is not critical and a greater number of shorter labial ports than the two extended ports shown in the embodiment according to FIGS. 3a, 3b, 4a, 4b, 5a and 5b may be used.

In a valve element of the type comprising superimposed membranes of rubber an improved labial port construction may be obtained by adhering the edges of the membranes along incisions or cut-out portions extending from the peripheral edge of the membranes towards the center thereof, such local adhesion along incisions or indentations resulting in the formation of intermediary labial ports bounded by mutually adhered zones on the two membranes having some radial component of direction. Such incisions or cuts also are a convenient means of dimensioning the labial ports.

While the main object of the present invention is a breathing valve comprising a resilient valve element as defined the basic principle of invention must be considered to be already materialized in the resilient valve element as a separate article of manufacture which thus forms a separate object of the present invention.

What we claim is:

1. A resilient valve element for use in a breathing valve having opposed inlet and outlet conduits terminating in mutually opposed spaced annular inlet and outlet seats, said valve element being a resiliently expansible hood having an open end adapted sealingly to be attached around said inlet seat and having a top portion opposite to said open end adapted upon resilient expansion of said hood when inserted into said breathing valve with the open end attached around said inlet seat to come into closing contact with said outlet seat, at least one port being provided through the wall of said valve element outwardly of said top portion, any such port being open when said hood is resiliently expanded and closed when said hood is resiliently contracted.

2. The resilient valve element as claimed in claim 1 in which a plurality of said ports are evenly spaced around an annular zone of said hood between a zone of attachment at the open end thereof and said top portion, said ports being slits adapted to open during internal pressure inflation of said hood and being closed in the non-inflated condition of said hood.

3. The resilient valve element as claimed in claim 1 in which a vibration damping mass it attached to said hood within the confines of said top portion.

4. A resilient valve element for use in a breathing valve having opposed inlet and outlet conduits terminating in mutually opposed and spaced annular inlet and outlet seats, said valve element being composed of two parts of resilient material one of which is a generally flat outer membrane and the other one of which is an inner funnel-shaped part, said membrane and the funnel mouth of said part having substantially identical circumferential shape and being circumferentially attached to each other along restricted portions of the circumference, the non-attached circumferential portions intermediate said attached portions forming labial ports, said funnel-shaped part at the end opposite to the funnel mouth terminating in an open throat end adapted sealingly to be attached around said inlet seat, said outer membrane being adapted to come into closing contact with said outlet seat upon resilient expansion of said valve element when inserted into said breathing valve with said throat attached around said inlet seat, said labial ports being open to permit outward flow of fluid from the interior of said valve element when said valve element is resiliently expanded by internal fluid pressure and said labial ports being closed by surface abutment between marginal zones of said membrane and of the funnel mouth portion of said funnel-shaped part when the fluid pressure prevailing on the outside of said valve element is at least equal to the fluid pressure prevailing within the valve element.

5. The resilient valve element as claimed in claim 4 in which tabs extend outwardly from the outer membrane at positions coinciding with the circumferential portions at which the outer membrane and funnel-shaped part are adhered to each other.

6. The resilient valve element as claimed in claim 4 in which a damping mass is attached to the inner surface of said outer membrane within a zone thereof adapted to act as a valve seat closure.

7. A breathing valve comprising within a valve body and in communication with a cavity therein an inlet conduit adapted to be connected to a source of breathing gas, an outlet conduit opening to the atmosphere and a patient conduit adapted to be brought into communication with the respiratory system of a patient, a resiliently expansible valve element being provided within said valve body cavity selectively to open and close communications between said inlet, outlet and patient conduits, said valve element being mounted in tight communication with the inner end of said inlet conduit within the valve body cavity to act in its non-expanded condition as a check valve in relation to said inlet conduit while leaving the outlet conduit in open communication with said valve body cavity, said valve element having an inner cavity in communication with said inlet conduit and at least one port adapted to open upon initial pressure-induced expansion of said valve element to establish communication between said inner cavity of the valve element and said valve body cavity, said valve element being adapted under the action of a forced gas flow from said inlet conduit to be expanded to varying degrees corresponding to flow pressure conditions to take positions involving a corresponding degree of opening of any such port up to a final functional position taken as soon as a certain predetermined gas supply pressure is reached, a central portion of said valve element in this final functional position being in closing contact with the end of said outlet conduit within said valve body cavity while a gas flow path is open from the inlet conduit to the patient conduit via said valve element cavity, any port provided in said valve element and said valve body cavity, the total flow area of any ports in the fully opened state being insufficient to prevent expansion of said valve element into outlet closing position by inflation at said predetermined and any higher gas supply pressure.

8. A breathing valve comprising within a valve body and in communication with a cavity therein an inlet conduit adapted to be connected to a source of breathing gas, an outlet conduit opening into the atmosphere and a patient conduit adapted to be brought into communication with the respiratory system of a patient, an annular inlet wall extending into said valve body cavity in continuation of said inlet conduit and an annular outlet wall extending into said cavity in continuation of said outlet conduit, the inner end of said inlet wall within said valve body cavity forming an annular inlet seat and the inner end of said outlet wall within said valve body cavity forming an annular outlet seat, said inlet and outlet seats being opposed to and spaced from each other, an elastically expansible valve element in the form of a hood having the open end sealingly attached around said inlet wall and having a top portion disposed in the space between said inlet and outlet seats for closing contact with respectively said outlet seat upon inflation of said hood by gas pressure supplied from the inlet conduit and with said inlet seat upon collapse of said hood when the pressure prevailing within said valve body cavity in cooperation with the resilient contracting tendency of the hood is sufficient to overcome the pressure prevailing within said inlet conduit, at least one port being provided in said hood outside said top portion, such port being adapted to open upon initial pressure-induced expansion of said valve element to establish a gas flow communication from said inlet conduit through such port into the valve body cavity surrounding said valve element, the total flow area of any ports in the fully opened state being insufficient to prevent said valve element from being expanded into closing contact with said outlet seat by a predetermined gas pressure supplied from said inlet conduit.

9. A breathing valve comprising within a valve body and in communication with a cavity therein an inlet conduit adapted to be connected to a source of breathing gas, an outlet conduit opening into the atmosphere and a patient conduit adapted to be brought into communication with the respiratory system of a patient, an annular inlet wall extending into said valve body cavity in continuation of said inlet conduit and an annular outlet wall extending into said valve body cavity in continuation of said outlet conduit, the inner ends of said inlet and outlet walls within said cavity forming mutually opposed and spaced inlet and outlet seats, said breathing valve further comprising a resilient valve element composed of two parts of resilient material one of which is a generally flat outer membrane and the other one of which is an inner funnel-shaped part, said membrane and the funnel mouth of said funnel-shaped part having substantially identical circumferential shape and being circumferentially attached to each other along restricted portions of the circumference, the non-attached circumferential portions intermediate said attached portions forming labial ports, said funnel-shaped part at the end opposite to the funnel mouth terminating in an open throat end sealingly attached around said inlet seat, said outer membrane being positioned in the space between said inlet and outlet seats to come into closing contact with said outlet seat upon resilient expansion of said valve element, said labial ports permitting outward gas flow from the interior of said valve element while checking flow of gas in the reverse direction.

10. The breathing valve as claimed in claim 9 in which said annular inlet wall is of circular cross-section and the opening at the throat end of said funnel-shaped part is of oblong configuration in the relaxed state of the valve element causing said funnel-shaped part to be deformed when said throat end is placed around said inlet wall.

11. The breathing valve as claimed in claim 9 in which said outer membrane is attached to the funnel mouth of said funnel-shaped part at two diametrically opposed circumferential zones, said annular inlet wall being of circular cross-sectional configuration, the opening at the throat end of said funnel-shaped part being of oblong configuration in the relaxed state of the valve element with the longer dimension of said oblong opening extending substantially between said opposed zones causing, when said throat end is placed around said inlet wall, said funnel-shaped portion and said outer membrane to be deformed in a way involving a narrowing of the dimension thereof between said opposed zones and an extension in a direction transversely of said dimension.

12. The breathing valve as claimed in claim 9 in which a circumferential groove is provided on the outer surface of said annular inlet wall, said throat end of said funnel-shaped part on the inner surface being provided with a corresponding bead adapted to come into resiliently holding and sealing engagement with said groove.

References Cited

UNITED STATES PATENTS

| 1,359,631 | 11/1920 | Teed | 137—525.1 |
| 1,506,012 | 8/1924 | Lewis | 137—102 XR |
| 2,640,481 | 6/1953 | Conley | 137—525 XR |
| 2,941,541 | 6/1960 | Peras | 137—525.1 XR |
| 3,084,707 | 4/1963 | Frye | 137—102 |
| 3,242,921 | 3/1966 | Seeler | 128—145.5 |

FOREIGN PATENTS

| 861,834 | 11/1940 | France. |
| 990,870 | 5/1965 | Great Britain. |

WILLIAM F. O'DEA, *Primary Examiner.*

RICHARD GIRARD, *Assistant Examiner.*

U.S. Cl. X.R.

137—525; 251—75